ated.  
UNITED STATES PATENT OFFICE.

JOSEPH F. MENNINGEN, OF WEST ALLIS, WISCONSIN, ASSIGNOR, BY MESNE ASSIGNMENTS, TO ALLIS-CHALMERS MANUFACTURING COMPANY, A CORPORATION OF DELAWARE.

INSULATING COMPOSITION.

1,119,442. Specification of Letters Patent. Patented Dec. 1, 1914.

No Drawing. Application filed March 12, 1909. Serial No. 483,048.

*To all whom it may concern:*

Be it known that I, JOSEPH F. MENNINGEN, a citizen of the United States, residing at West Allis, in the county of Milwaukee and State of Wisconsin, have invented certain new and useful Improvements in Insulating Compositions, of which the following is a full, clear, and exact specification.

This invention relates to improvements in insulating compositions or compounds and to the methods of forming the same.

The object of the invention is the provision of a compound which possesses excellent insulating properties, which is fireproof, impervious to oil or moisture of any kind, and which is extremely hard, compact and imporous.

The particular ingredients of my improved insulating compound are hydraulic cement, asbestos and shellac or other equivalent substance of a resinous nature possessing like qualities as a binder in the composition; and if desired, some coloring matter may be added. Any suitable hydraulic cement may be employed, such as Portland cement, natural cement, Puzzolan cement or hydraulic lime, but I prefer to employ Portland cement, and the asbestos may be either fibrous or in the form of a powder, depending upon the purpose to which the insulating articles are to be put, and to some extent on the particular shape of the same.

The proportions by weight of the ingredients which I have found by careful experiment to produce a compound which answers all the requirements very effectively, are substantially as follows: Five parts of cement, three parts of asbestos, four parts of shellac, and one-eighth part of coloring matter, if the latter is added.

In carrying out my invention, the shellac having been dissolved in a suitable amount of alcohol to give the proper working consistency (about equal parts of flake shellac and alcohol have been found satisfactory), the parts are thoroughly mixed so as to produce a mixture or composition having substantially the consistency of soft putty. This mixture is then subjected simultaneously to both heat and pressure, this being preferably accomplished by placing the mixture in a hot mold and compressing the same in a suitable press, such as a hand press. The mixture is then allowed to stand, the pressure of the press having been removed, and bake in the mold for a short time, say from one to two minutes, and is then again subjected simultaneously to both heat and pressure in the press, the mold being preferably reheated in order that the mixture may be heated to the proper temperature. This second heating and compressing operation completes the formation of the compound, which is then cooled preferably by being placed in cold water.

The first step of the molding operation, consisting of subjecting the mixture to heat and pressure simultaneously, accomplishes the result, through the applied pressure, of forcing the mixture to the various parts of the mold, and this is no small matter where the molded article is provided with small projections and sharp-angled recesses. This will be appreciated since the consistency of the mixture is only such as is produced by a limited amount of alcohol, the only thinning material employed to bring the composition to a workable consistency. The heat applied to the mixture during this pressing is sufficient to bring the temperature to a point where the alcohol will be readily evaporated, and, if the article is of small mass, the alcohol may be evaporated even while the pressure is being applied. Ordinarily, however, especially with larger articles, when pressure has been applied to a sufficient degree to cause the mixture to fill the mold, the molded mass is relieved of pressure and allowed to stand while subjected to heat alone, thus effecting, to some extent, a baking of the article. During this period, the alcohol used in obtaining a workable mixture is evaporated. While, with articles of small mass, the evaporation necessary may be accomplished while pressure is being applied, nevertheless, the absence of applied pressure allows the alcohol to escape much more readily from the mold; and, further, the requisite evaporation cannot be accomplished with large articles, since the evaporated alcohol cannot escape readily, and may even be sufficient to cause an explosion of the mold when pressure is applied continuously. Although it has been subjected to heat alone for a comparatively short time, the mold is again subjected to both heat and pressure. This heat and pressure acts to compact the molded mass, which has shrunk perceptibly, due to the evaporation of alcohol, and to completely bake the molded article and render the same close-grained, hard and firm.

It is to be noted that two pressing operations are necessary in most cases, the one to properly fill the mold and to impart the desired shape to the molded article, and the other to thoroughly compact the molded article after the alcohol has been evaporated. It is desirable that the mixture be subjected to heat from the time it is put in the mold, in order to quickly and efficiently rid the molded mass of alcohol and to thoroughly bake and harden the molded article.

A compound formed of the materials and proportions above named and in the manner above described is found to answer all the necessary requirements very effectively and at the same time is easy and inexpensive to manufacture. It is particularly useful for those insulating articles which must possess considerable hardness and are exposed to rain, oil, or moisture in other forms.

What I claim as new and desire to secure by Letters Patent is:

1. An insulating compound containing hydraulic cement, asbestos, and a binder of shellac.

2. An insulating compound containing hydraulic cement, asbestos, a binder of shellac, and coloring matter.

3. An insulating compound containing substantially five parts of hydraulic cement, three parts of asbestos, and four parts of shellac.

Milwaukee, Wis., March 5, 1909.

In testimony whereof I affix my signature, in the presence of two witnesses.

JOSEPH F. MENNINGEN.

Witnesses:
  H. C. CASE,
  CHAS. L. BYRON.